United States Patent
Jendbro et al.

(10) Patent No.: US 7,904,078 B2
(45) Date of Patent: Mar. 8, 2011

(54) MOBILE PEER-TO-PEER NETWORKS

(75) Inventors: Magnus Jendbro, Staffanstorp (SE); William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 473 days.

(21) Appl. No.: 11/419,343

(22) Filed: May 19, 2006

(65) Prior Publication Data

US 2007/0270139 A1 Nov. 22, 2007

(51) Int. Cl.
*H04Q 7/20* (2006.01)
(52) U.S. Cl. .............. 455/422.1; 455/41.2; 455/41.3; 455/420; 455/425; 455/466; 370/338; 370/328; 370/329; 370/347
(58) Field of Classification Search .......... 455/3.06, 455/410, 422.1, 425, 67.11, 517, 41.2–41.3, 455/414.1, 420, 466; 713/150, 171; 705/52; 730/338, 254; 370/338, 254, 328, 347
See application file for complete search history.

(56) References Cited

U.S. PATENT DOCUMENTS

| | | | | |
|---|---|---|---|---|
| 7,350,077 | B2 * | 3/2008 | Meier et al. ............... | 713/171 |
| 7,433,324 | B2 * | 10/2008 | Switzer et al. ............. | 370/254 |
| 7,515,873 | B2 * | 4/2009 | Brown et al. ............. | 455/3.01 |
| 2003/0074403 | A1 | 4/2003 | Harrow et al. | |
| 2004/0023652 | A1 | 2/2004 | Shah et al. | |
| 2005/0153736 | A1 * | 7/2005 | Ganton ..................... | 455/553.1 |
| 2005/0239438 | A1 * | 10/2005 | Naghian .................... | 455/410 |
| 2006/0041943 | A1 | 2/2006 | Singer et al. | |
| 2006/0136340 | A1 * | 6/2006 | Park .......................... | 705/52 |
| 2007/0010195 | A1 * | 1/2007 | Brown et al. ............. | 455/3.06 |
| 2007/0055862 | A1 * | 3/2007 | Sharma et al. ............ | 713/150 |
| 2007/0087696 | A1 * | 4/2007 | Bonta et al. .............. | 455/67.11 |
| 2007/0160004 | A1 * | 7/2007 | Sakhpara .................. | 370/329 |

FOREIGN PATENT DOCUMENTS

RU 2004126701 A 5/2005

OTHER PUBLICATIONS

International Search Report for corresponding PCT Application No. PCT/IB2006/054326, mailed May 4, 2007.
International Preliminary Report on Patentability for corresponding PCT application No. PCT/IB2006/054326, mailed Jul. 31, 2008, 6 pages.

* cited by examiner

*Primary Examiner* — Nick Corsaro
*Assistant Examiner* — Michael T Vu
(74) *Attorney, Agent, or Firm* — Harrity & Harrity, LLP

(57) ABSTRACT

Mobile terminals may connect to one another of dynamically formed local networks to exchange certain files, such as bandwidth intensive files. Licensing or payment information for these files may be exchanged via a wide-area network, such as the cellular network to which the mobile terminals normally connect. In one embodiment, a mobile terminal includes logic to join a local network in response to the mobile terminal coming into range of the local network; logic to request a file from the local network; logic to receive the file from the local network when the file is available from another mobile terminal in the local network; and logic to exchange payment or license information for the file over a cellular network.

30 Claims, 5 Drawing Sheets

MOBILE PEER-TO-PEER NETWORKS

BACKGROUND

A. Technical Field of the Invention

Implementations described herein relate generally to mobile communication devices, and more particularly, to local networks of mobile communication devices.

B. Description of Related Art

Communication devices, such as mobile telephones or terminals, have become increasingly versatile. For example, mobile telephones often support features in addition to voice communication. Such features may be implemented as software applications or programs on the communication device that enables the user to, for example, play music and games, obtain directions or maps to a place of interest, obtain sports scores, obtain weather information, or access email. Such additional features have made mobile terminals increasingly important to users.

Frequently, while using the additional features of a mobile terminal, a user of the mobile terminal may wish to download additional data to the mobile terminal. For example, music files may be downloaded to the mobile terminal to support a portable media player feature of the device. As another example, the user may wish to download directions to a place of interest or a map of the place of interest. Files such as music files and map files tend to be somewhat large files. Downloading such large files over a mobile telephone network, such as a relatively slow cellular network, can be expensive and/or time consuming for the user.

Accordingly, it is desirable to improve downloading of files to mobile communication devices.

SUMMARY

One aspect is directed to a mobile terminal including logic to join a local network in response to the mobile terminal coming into range of the local network; logic to request a file from the local network; logic to receive the file from the local network when the file is available from another mobile terminal in the local network; and logic to exchange payment or license information for the file over a cellular network.

Additionally, the logic to join a local network further includes logic to store identifiers for a predefined group of mobile terminals; logic to receive location information from the mobile terminals in the predefined group of mobile terminals; and logic to determine whether to join the local network based on the received location information. Additionally, the location information is received over the cellular network.

Additionally, the logic to join the local network includes logic to receive broadcasts from other mobile terminals requesting to join a local network.

Additionally, the mobile terminal may include logic to receive the file from the cellular network when the file is not available from the local network.

Additionally, the local network may be an ad-hoc network that is dynamically formed between mobile terminals in the cellular network. The logic to join the local network may include logic to provide Bluetooth connectivity. The file may be a multi-media file.

Additionally, the local network may be a higher bandwidth network than the cellular network. The logic to receive the file from the local network includes logic to receive a portion of the file from a first mobile terminal in the local network and to receive a second portion of the file from a second mobile terminal in the local network.

Another aspect is directed to a system including a cellular network and a first mobile terminal. The first mobile terminal includes a first radio transceiver for connecting to the cellular network, a second radio transceiver for connecting to a local network formed of other mobile terminals, logic to exchange files with the other mobile terminals via the second radio transceiver, when the other mobile terminals are available, and to receive files from the cellular network when the other mobile terminals are not available.

Additionally, the first mobile terminal may further include logic to exchange payment or licensing information with the cellular network when the files exchanged with the other mobile terminals require payment or a license.

Additionally, the local network may be a peer-to-peer network. The local peer-to-peer network may be an ad-hoc network that is dynamically formed between mobile terminals in the cellular network.

Additionally, the logic to exchange files with the other mobile terminals may include logic to exchange files with the other mobile terminals when the other mobile terminals are separated from the first mobile terminal by at least two hops in the local network.

Additionally, the second radio transceiver may implement a Bluetooth connection.

Another aspect is directed to a method including connecting to a local peer-to-peer network; receiving a first file over the peer-to-peer network; and exchanging payment or license information for the first file over a wide area network.

Additionally, the wide area network may be a cellular network.

Additionally, the local peer-to-peer network may be an ad-hoc network that is dynamically formed between mobile terminals in the cellular network.

Additionally, receiving the first file over the peer-to-peer network may further include determining whether the first file is available on the peer-to-peer network; receiving the first file over the peer-to-peer network when the first file is determined to be available on the peer-to-peer network; and receiving the first file over the wide area network when the first file is not available on the peer-to-peer network.

Additionally, the local peer-to-peer network is a network of mobile terminals and receiving the first file over the peer-to-peer network further includes receiving the first file at a first mobile terminal from a second mobile terminal, the second mobile terminal being separated from the first mobile terminal by at least two hops in the peer-to-peer network.

Additionally, the local peer-to-peer network may be formed via Bluetooth connections and the wide area network may be formed as a cellular telephone network.

Additionally, the first file may be a multi-media file.

Additionally, the local peer-to-peer network may be a higher bandwidth network than the wide area network.

In another aspect, a method includes dynamically forming a local network of mobile terminals; exchanging files over the local network when the files are available in the local network; receiving the files from a cellular network when the files are not available on the local network; and exchanging payment or license information for the files over the cellular network when the files are exchanged over the local network.

Additionally, the method further includes exchanging payment or license information for the files over the cellular network when the files are received over the cellular network.

Additionally, the local network may be a peer-to-peer ad-hoc network that is dynamically formed between mobile terminals in the cellular network.

Additionally, the ad-hoc network includes at least some mobile terminals separated from each other by multiple hops in the ad-hoc network.

Additionally, the local network may be formed via Bluetooth connections

Additionally, the files may be multi-media files. The local network may be a higher bandwidth network than the cellular network.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Mobile terminals and techniques for connecting mobile terminals are described herein in which multiple mobile terminals may dynamically form local networks with one another. Mobile terminals in a dynamically formed local area network may directly exchange data with one another. Control information relating to this data, such as licensing or payment information may be transmitted through the wide area network normally used by the mobile terminals (e.g., a cellular network).

Exemplary System Overview

Figure 1:
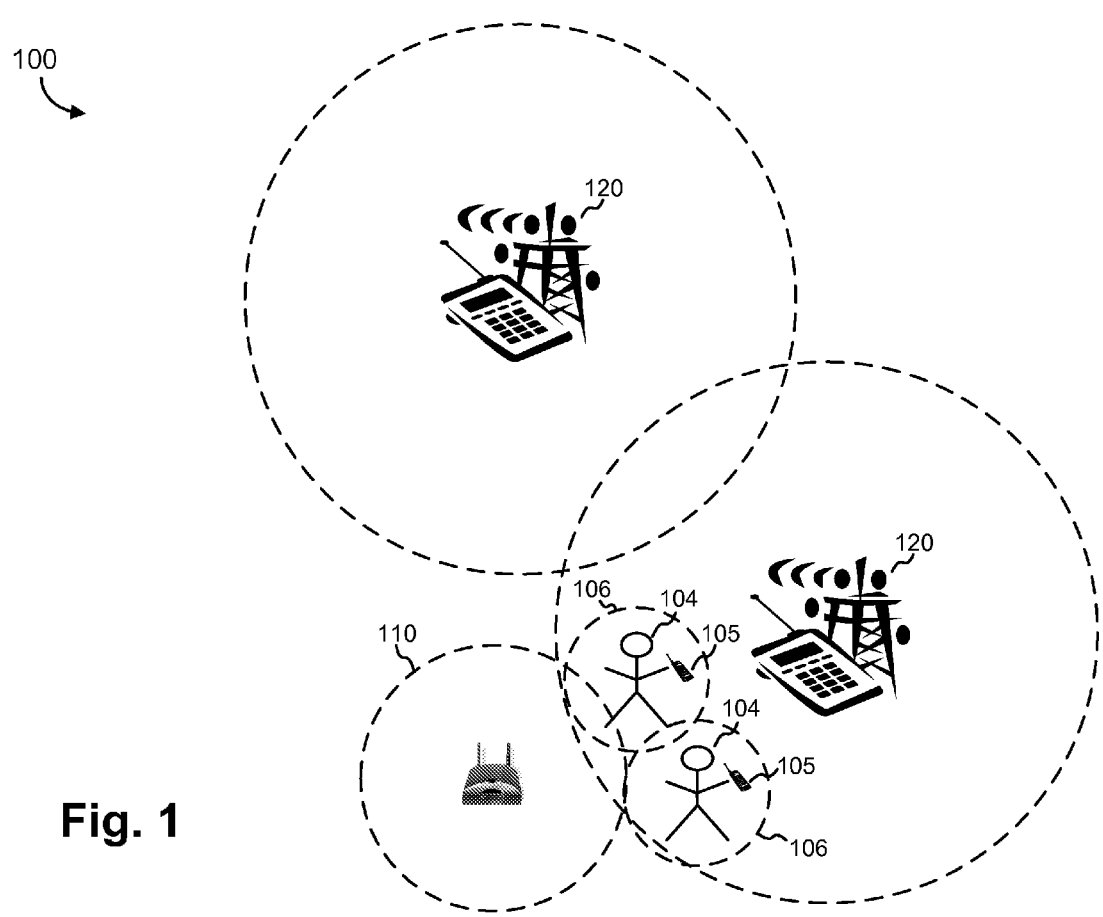
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include a number of different wired or wireless networks. The networks may include, for example, traditional wired network portions, WiFi (i.e., IEEE 802.11) network connections, Bluetooth connections, cellular networks, etc. As is particularly illustrated in FIG. 1, system 100 includes mobile telephone network base stations 120, also called cellular network base stations 120, herein, which may be used to implement a cellular network.

Mobile users 104 are also illustrated in FIG. 1. Mobile users 104 may carry mobile terminals 105, which the mobile users may use to communicate in the cellular network.

In addition to the cellular network created by base stations 120, system 100 may also include other types of wireless connections, such as a wireless access point 110 of a WiFi network and Bluetooth connections 106 generated by mobile terminals 105. Wireless access point 110, Bluetooth connections 106, and the cellular connections generated by base stations 120 may each be associated with a corresponding network range, indicated in FIG. 1 by the dashed circles. Typically, the ranges of the connections generated by the wireless access point 110 and the Bluetooth connections 106 are smaller than the range of the cellular connections generated by base stations 120.

Mobile terminals 105 may themselves be capable of networking with nearby devices using, for example, Bluetooth connection 106. For example, when two users 104 of mobile terminals 105 come within range of the Bluetooth connectivity supported by the mobile terminals, the two mobile terminals may dynamically connect with one another to form a local connection. Bluetooth is a known standard for wireless personal area networks (PANs). Although aspects of the invention will be described herein with reference to Bluetooth connections, one of ordinary skill in the art will realize that other standards for forming local wireless connections could be used instead.

Users 104 may move within system 100 in a manner that may, at different times, take them in and out of connectivity of the various network connections shown in FIG. 1. Relatively short range connections, such as Bluetooth connections 106 and WiFi connections, may frequently dynamically break and reform as users come into and out of range of one another.

Figure 2:
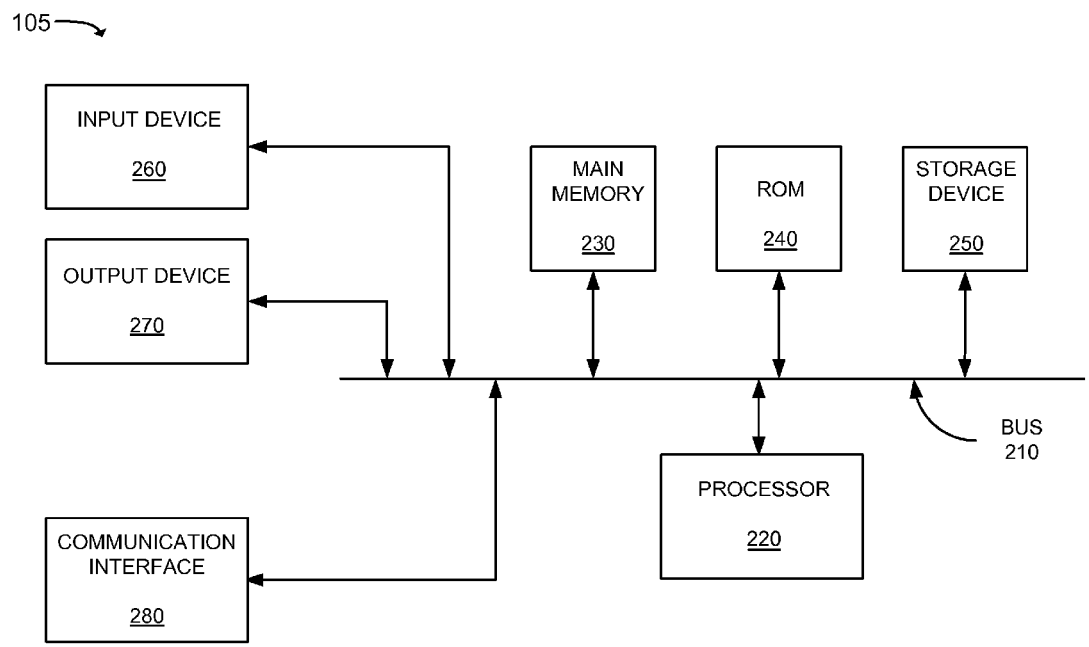
FIG. 2 is a diagram of an exemplary mobile terminal shown in FIG. 1.

FIG. 2 is an exemplary diagram of one of mobile terminals 105. Mobile terminal 105 may include a bus 210, a processor 220, a main memory 230, a read only memory (ROM) 240, a storage device 250, an input device 260, an output device 270, and a communication interface 280. Bus 210 may include a path that permits communication among the components of mobile terminal 105.

Processor 220 may include any type of conventional processor, microprocessor, or processing logic that may interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may provide for non-volatile rewritable storage. For example, storage device 250 may include a magnetic recording medium, such as a hard disk drive, or non-volatile semiconductor storage, such as a Flash memory device.

Input device 260 may include conventional mechanisms that permit a user to input information to mobile terminal 105. Input device may include, for example, keys, dials, switches, etc., on the face of mobile terminal 105 that permit the user to enter information. Input device 260 may additionally include an interface to other known input devices, such as a keyboard, a mouse, a pen, voice recognition and/or biometric mechanisms, etc. Output device 270 may include a conventional mechanism that outputs information to the user, including a display, a speaker, etc.

Communication interface 280 may include any transceiver-like mechanism that enables mobile terminal 105 to communicate with other devices and/or systems. For example, communication interface 280 may include mechanisms for communicating with another device or system. Communication interface 280 may include, for example, an antenna or multiple antennas for connecting to one or more of the network connections shown in FIG. 1, such as the cellular network, a Bluetooth connection, and/or a WiFi connection.

Dynamic Creation of Local Area Networks

Various mobile terminals 105 may move in and out of proximity of one another as the user carrying the mobile terminal moves about. Assume that a mobile terminal 105 includes Bluetooth connectivity. Bluetooth is a radio standard primarily designed for low power consumption and tends to have a relatively short range of approximately 1 meter, 10 meters, or 100 meters, depending on the Bluetooth power class of the mobile terminal.

Users of mobile terminals 105 may dynamically connect with one another to form local networks as the users move into range of one another. In one implementation, the local networks may be formed as ad-hoc peer-to-peer networks. Ad hoc networks are generally known in the art. In an ad-hoc network of mobile terminals, the mobile terminals cooperatively route traffic amongst themselves. Ad-hoc networks are usually wireless networks. Nodes (i.e., mobile terminals) in these networks may not be permanent: they are instead based on physical proximity at any given point in time. The network adjusts dynamically to changing node structure, which may result from node mobility or failure.

In an ad-hoc network, some or all of the mobile terminals in the ad-hoc network may be capable of network routing functions and others may be merely sources or destinations for data traffic. All or some of the mobile terminals in the ad-hoc network may execute a set of algorithms, and perform a set of networking protocols, that enable the mobile terminals to find each other, determine paths through the network for data traffic from source to destination(s), and detect and repair ruptures in the ad-hoc network, for example, as nodes move, as they fail, as battery power changes, or as communication path characteristics change over time.

Figure 3:
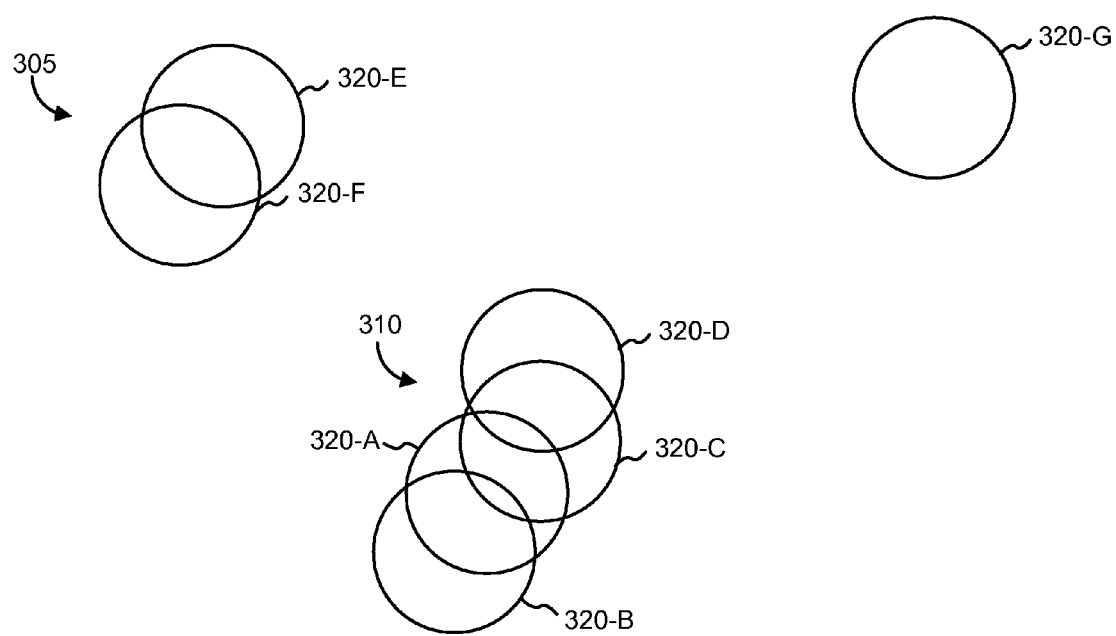
FIG. 3 is a diagram illustrating formation of peer-to-peer ad-hoc networks among groups of mobile terminals.

FIG. 3 is a diagram illustrating formation of peer-to-peer ad-hoc networks among groups of mobile terminals. Each circle 320-A through 320-G in FIG. 3 represents a mobile terminal and a corresponding connectivity range of the mobile terminal. For mobile terminals using Bluetooth to connect to one another, the radius of each circle may correspond to approximately 100 meters or less. Two ad-hoc networks, networks 305 and 310 are shown in FIG. 3, along with an isolated mobile terminal 320-G.

Ad-hoc network 310 includes four mobile terminals 320-A through 320-D and ad-hoc network 305 includes the two mobile terminals 320-E and 320-F. Assume mobile terminal 320-G is not within range of any other mobile terminal and thus is not able to form a local network connection.

Each of the four mobile terminals in ad-hoc network 310 may be able to communicate with any of the other four mobile terminals, even if two end-point mobile terminals are not directly within range of one another. For example, if mobile terminals 320-B and 320-D wish to communicate, the communication may be relayed through mobile terminals 320-A and 320-C. In this situation, the communication path covers multiple "hops" in the ad-hoc network 310.

In alternate implementations, instead of mobile terminals dynamically forming ad-hoc networks without any source of external control, mobile terminals may form local networks under the control of a wide area network, such as a cellular network associated with the mobile terminals. In this implementation, instead of, or in combination with, mobile terminals 320 independently joining and forming local ad-hoc networks, mobile terminals 320 may form local networks with the assistance of the cellular network. For example, the cellular network may be able to determine the location of a particular mobile terminal based on the base station with which the mobile terminal is communicating or based on global positioning system (GPS) information determined by GPS circuitry installed within the mobile terminal. The cellular network may use this information to assist the mobile terminals in forming local peer-to-peer networks, such as by informing a mobile terminal that it is near another mobile terminal and should be able to form a local network.

The formation of local ad-hoc networks and local networks formed with the assistance of the cellular network can be additionally refined based on whether the mobile terminals are known to one another ahead of time.

Consider the situation in which a predefined group of mobile terminals (e.g., mobile terminals of friends, schoolmates, etc) exists. In this case, each mobile terminal may store a identifier for all of the other mobile terminals in the group. Each of the active mobile terminals may exchange location information (such as location information determined via GPS) with each of the other mobile terminals. When the location information indicates that two (or more) of the mobile terminals are close enough to form a local network, the mobile terminals may connect with one another. The location information can be exchanged in a number of ways. For example, the location information may be sent over the cellular network as SMS (Short Message Service) messages or as other data protocols sent over the cellular network. The cellular network itself need not be aware that the messages relate to location information for local networks. The location information may be exchanged continuously or periodically between mobile terminals. In some implementations, the location information may be exchanged asynchronously, such as based on the occurrence of a trigger event. For example, the mobile terminal may broadcast its location information whenever the location information changes by more than a predetermined distance.

As an alternate situation to the one discussed in the previous paragraph, consider the situation in which the mobile terminals are "strangers" or are otherwise not allocated to predetermined groups. In this situation, which was generally described above with reference to the ad-hoc networks, the mobile terminals may connect with one another by broadcasting their presence, and potentially the information desired, using their short range transceiver (e.g., Bluetooth or WiFi transceiver). A nearby mobile terminal may then choose whether to respond and supply the desired data and/or connect to the local network. Another way of connecting for mobile terminals that are not allocated to predetermined groups is for the cellular network to broadcast the location of a first mobile terminal to other mobile terminals in the vicinity of the first mobile terminal. The other mobile terminals may then elect whether to join the local network by connecting with the first mobile terminal using the short range transceiver.

Operation Of Local Networks In Transferring Files

The local peer-to-peer networks formed by groups of mobile terminals may be used to transfer files (or any other unit of data), such as media files, image files, or other information between mobile terminals in a local network.

Figure 4:
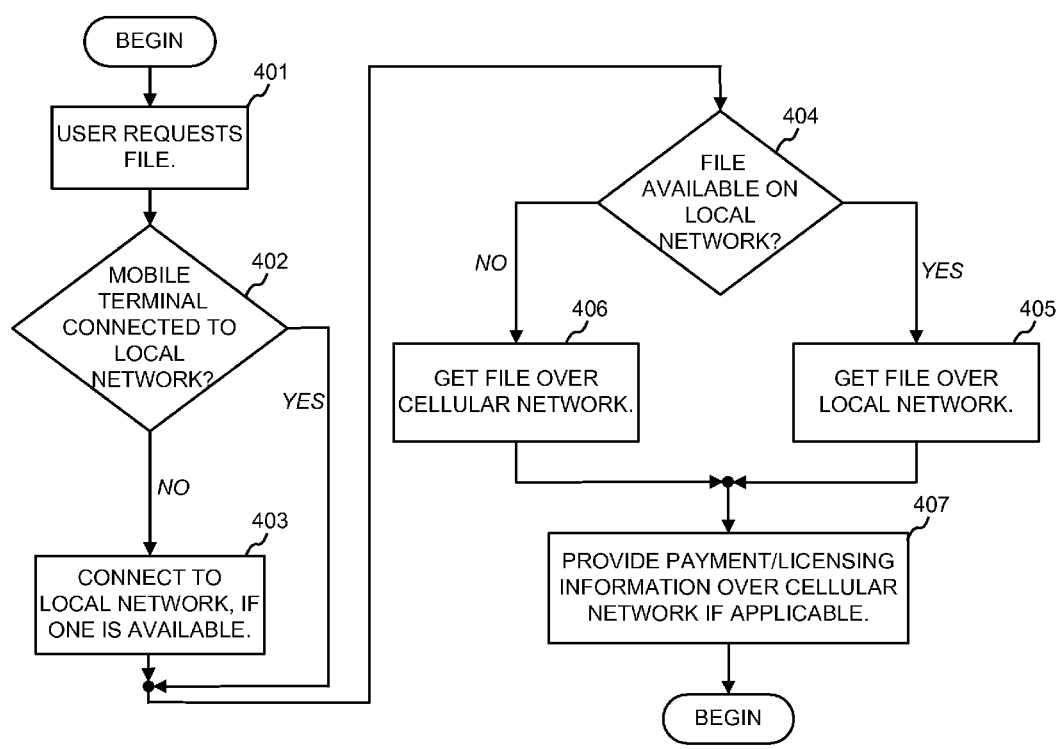
FIG. 4 is a flow chart illustrating exemplary operations for transferring data between mobile terminals in a local network.

FIG. 4 is a flow chart illustrating exemplary operations for transferring data between mobile terminals in a local network. Assume that a user, such as a user 104, requests a file from the user's mobile terminal (act 401). For example, the user may request a media file such as a song or video that the user would like to listen to or view, an image file such as a map, or a file defining a software application. The file may be an "open" file, i.e., freely available in the public domain, that can be freely transferred between other users or a file subject to legal restrictions and which may be associated with policies that restrict how the file can be disseminated. Regarding files subject to legal restrictions, such files may be protected by a digital rights management (DRM) scheme that specifies policies controlling access to the file. The policies may, for example, specify licensing information such as a price of the file and the rights obtained with the license.

If the mobile terminal is not connected to a local network, such as local network 310, the mobile terminal may connect to a local network (acts 402 and 403). As previously described, the mobile terminal may connect to a local network by joining a peer-to-peer network of other mobile devices, such as an ad-hoc network implemented over Bluetooth or over other types of short range wireless connections. In some implementations, the mobile terminal may be configured to always join a local network whenever the mobile terminal comes into range of a compatible local network. In this implementation, acts 402 and 403 may not be necessary.

A determination may be made as to whether the requested file is available (act 404). In some implementations, the mobile terminal may determine whether the requested file is available by, for example, flooding the local network with a file request message in which the requested file is identified. In other implementations, the mobile terminals that comprise the local network may periodically broadcast the files that each mobile terminal has available such that each mobile terminal can keep a list of the files that are available.

If a file is available over a local network, the mobile terminal may retrieve the file from the local network (act 405). If the file is not available over the local network, the mobile terminal may retrieve the file from the cellular network if the file is available on the cellular network (act 406). Relative to retrieving a file from the cellular network, the local network may be a higher bandwidth network and/or lower cost network. Accordingly, by given preference to the local network over the cellular network when retrieving files, the user of the mobile terminal may receive the file faster and/or at a lower cost.

In some implementations, it may be possible to request and exchange portions of files, which may then be assembled by the receiving mobile terminal. For example, a mobile terminal may receive only a first portion of a file from a first mobile terminal because the first mobile terminal may leave the local network before the file is fully transferred. The first mobile network may then download the remainder of the file or another portion of the file from another mobile terminal or from the cellular network.

As previously mentioned, some files may be files subject to legal restrictions that require the receiving user to obtain a license before the file can be used. In these situations, payment information and/or license information may be exchanged through the cellular network (act 407). The provider of the cellular network may, for example, charge the account of the user associated with the receiving mobile terminal or otherwise handle payment for the file. In some implementations, act 407 can be automatically performed in a manner that is convenient for the user. The exchange of the payment/licensing information will typically be a relatively small amount of information relative to the file received by the mobile terminal. Accordingly, the user of the mobile terminal, when desiring to download relatively large files, can obtain the benefit of receiving the bandwidth intensive part of the transaction (the file) over a more efficient local network while exchanging payment/licensing information over the cellular network.

Although act 407 was described above as being performed after the file is downloaded over the local network, it can be recognized that in some implementations, the payment/licensing information may be obtained concurrently or before downloading of the file. In many situations, it may be desirable to require that the payment/licensing information be successfully processed before the user is allowed to download or use the file.

Figure 5:
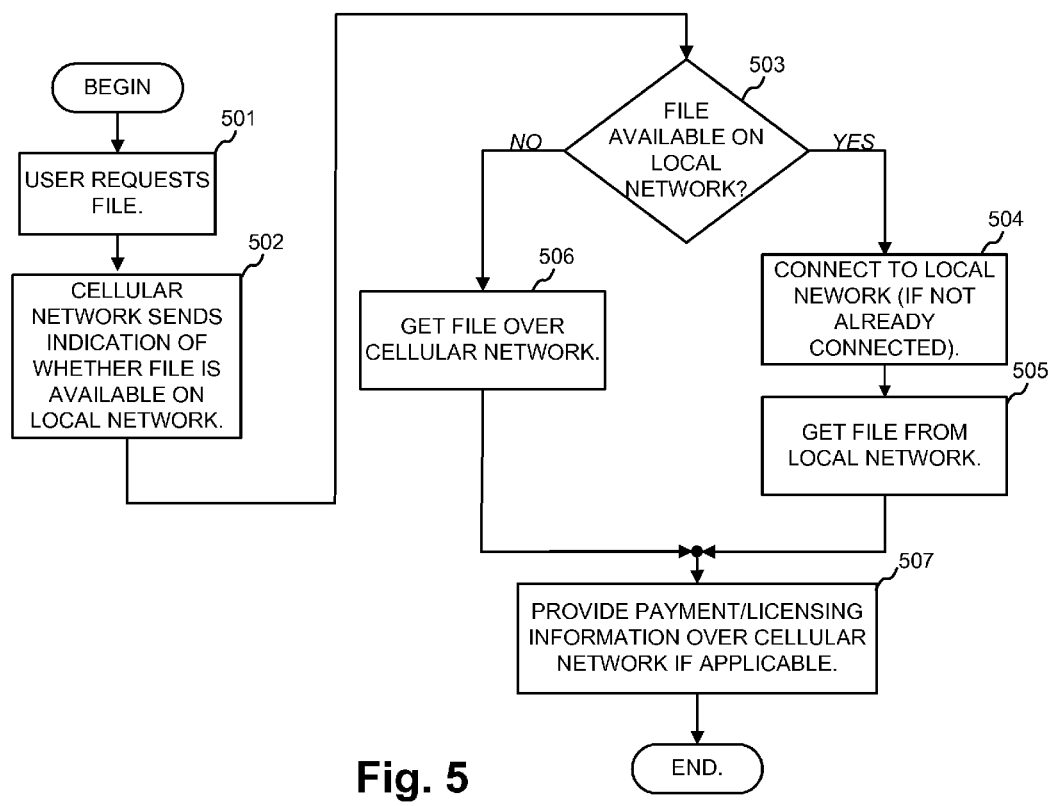
FIG. 5 is a flow chart illustrating exemplary operations for transferring files between mobile terminals in a local network consistent with a second embodiment.

FIG. 5 is a flow chart illustrating exemplary operations for transferring files between mobile terminals in a local network consistent with a second embodiment. The flow chart of FIG. 5 is similar to the flow chart shown in FIG. 4. In this embodiment, however, the cellular network keeps track of which files are available on which mobile terminals.

The process may begin when a user requests a file (act 501). The cellular network may respond by sending an indication to the user's mobile terminal of whether the requested file is available on a local network (act 502). The cellular network may also, for example, identify the particular mobile terminal (s) that contain the requested file. If the cellular network determines that the file is available on the local network, the mobile terminal may connect to the local network (if not already connected) and download the file (acts 503, 504, and 505). Otherwise, if the local terminal is not already connected to the local network, the mobile terminal may download the file over the cellular network (acts 503 and 506). Payment/licensing information may also be exchanged over the cellular network in a manner similar to that described above in act 407 (act 507).

The formation of local networks and use of the local networks as described above can be useful in numerous situations. Consider, for example, a user that has a mobile terminal that has the capability to store and play songs. The user may wish to download a new song to the mobile terminal. If the user is in a crowded area and the song is a fairly popular song, there is a good chance that there is a user either within direct range of a local connection of the user (e.g., within approximately 100 meters for a Bluetooth class 1 device) or within "indirect" range of the local connection. Indirect range, as used herein, refers to another user that is accessible via multiple hops on the local network (e.g., mobile terminals 320-B and 320-D in FIG. 3). In either case, the user may then download the song over the local network and exchange payment/licensing information, if necessary, over the cellular network.

As another example of the formation and use of local networks, consider the situation in which a car driver with a navigation equipped car is traveling in or to an area for which additional map data is needed. There may be a good chance that someone driving in the opposite direction has already downloaded that portion of the map. Accordingly, the user may be able to quickly download the needed portion of the map over the local network.

CONCLUSION

Implementations consistent with principles of the invention relate to mobile terminals and techniques for connecting mobile terminals in which certain files, such as bandwidth intensive files, may be exchanged through local networks formed by the mobile terminals. Licensing or payment information for these files may be exchanged via a wide-area network, such as the cellular network to which the mobile terminals normally connect.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 4 and 5, the order of the acts may be modified in other implementations consistent with the principles of the invention. Further, non-dependent acts may be performed in parallel.

The term "mobile telephone" or "mobile terminal," as used herein, may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

It should be emphasized that the term "comprises" or "comprising" when used in the specification is taken to specify the presence of stated features, integers, steps, or components but does not preclude the presence or addition of one or more other features, integers, steps, components, or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A mobile terminal comprising:
    a processor; and
    a memory to store at least one instruction that when executed by the processor, causes the processor to:
        join a local wireless network, in response to the mobile terminal coming into range of the local wireless network, the local wireless network comprising an ad-hoc network that is dynamically formed between a predefined group of mobile terminals that are within a particular distance of the mobile terminal, where the at least one instruction to join a local wireless further causes the processor to:
        store identifiers for the predefined group of mobile terminals,
        receive location information from at least one mobile terminal of the predefined group of mobile terminals, and
        determine whether to join the local wireless network based on the received location information;
        flood the local wireless network with a message requesting a file, where the message is sent to the mobile terminals without being sent to a device that is not part of the local wireless network;
        determine if the requested file is available from another mobile terminal in the local wireless network;
        receive the file from the local wireless network when the file is available from another mobile terminal in the local wireless network; and
        exchange payment or license information for the file over a cellular network.

2. The mobile terminal of claim 1, where the location information is received over the cellular network.

3. The mobile terminal of claim 1, where the at least one instruction to join a local wireless network further causes the processor to: receive broadcasts from other mobile terminals requesting to join the local wireless network.

4. The mobile terminal of claim 1, where the at least one instruction to join a local wireless network further causes the processor to
    receive the file from the cellular network when the file is not available from another mobile terminal connected to the local wireless network.

5. The mobile terminal of claim 1, where the at least one instruction to join a local wireless network further causes the processor to:
    provide Bluetooth connectivity.

6. The mobile terminal of claim 1, where the file is a multi-media file.

7. The mobile terminal of claim 1, where the local wireless network is a higher bandwidth network than the cellular network.

8. The mobile terminal of claim 1, where when the processor is to receive the file from the local wireless network, the processor further is to:
    receive a portion of the file from a first mobile terminal in the local wireless network and to receive a second portion of the file from a second mobile terminal in the local wireless network.

9. A system that includes a cellular network and a local wireless network, the system comprising:
    a first mobile terminal including:
        a processor,
        at least one memory to store identifiers for a predefined group of mobile terminals and to store at least one instruction to be executed by the processor,
        a first radio transceiver for connecting to the cellular network, and
        a second radio transceiver for connecting to the local wireless network, where the local wireless network is formed of the predefined group of mobile terminals that are within a particular distance of the first mobile terminal, based on location information received from one or more of the predefined group of mobile terminals, and
        where, when the at least one instruction is executed by the processor, the processor is to:
        determine if a file is available in another mobile terminal, in the local wireless network to which the first mobile terminal is connected, where the determining is based on receiving a periodic broadcast of available files from the other mobile terminal, and
        receive the file from the other mobile terminal, via the local wireless network, using the second radio transceiver, when the file is available from other mobile terminal, and to receive the file from the cellular network when the file is not available from the other mobile terminal.

10. The system of claim 9, where the local wireless network, formed of the other mobile terminals, is formed from the predetermined group of mobile terminals that continuously, periodically, or asynchronously update other mobile terminals in the group with the location information.

11. The system of claim 9, where when the at least one instruction is executed by the processor, the processor further is to:
exchange payment or licensing information with the cellular network when the file received from the other mobile terminal requires payment or a license.

12. The system of claim 9, where the local wireless network is a peer-to-peer network.

13. The system of claim 12, where the local wireless peer-to-peer network is an ad-hoc network that is dynamically formed between mobile terminals in the cellular network.

14. The system of claim 9, where when the processor is to receive the file from the other mobile terminal, the processor further is to:
receive the file from the other mobile terminal when the other mobile terminal is separated from the first mobile terminal by at least two hops in the local wireless network.

15. The system of claim 9, where the second radio transceiver implements a Bluetooth connection.

16. A method performed by a first mobile terminal, which stores identifiers identifying a predefined group of mobile terminals, the method comprising:
connecting, using a communication interface of the first mobile terminal, to a local wireless peer-to-peer network comprising the predefined group of other mobile terminals based on location information received from the predefined group of mobile terminals;
flooding, using the communication interface, the local wireless peer-to-peer network with a message requesting a first file, where the message is sent to the other mobile terminals without being sent across a wide area network; determining, by a processor of the first mobile terminal, that the first file is available from a second mobile terminal in the local wireless peer-to-peer network;
receiving, by the communication interface, the first file over the local wireless peer-to-peer network from the second mobile terminal; and
exchanging, by the communication interface, payment or license information for the first file over the wide area network.

17. The method of claim 16, where the wide area network is a cellular network.

18. The method of claim 17, where the local wireless peer-to-peer network is an ad-hoc network that is dynamically formed between mobile terminals in the cellular network.

19. The method of claim 16, where receiving the first file over the local wireless peer-to-peer network further includes:
receiving the first file over the local wireless peer-to-peer network when the first file is determined to be available on the local wireless peer-to peer network; and
receiving the first file over the wide area network when the first file is not available on the local wireless peer-to-peer network.

20. The method of claim 16, where receiving the first file over the local wireless peer-to-peer network further includes:
receiving the first file at the first mobile terminal from the second mobile terminal, the second mobile terminal being separated from the first mobile terminal by at least two hops in the local wireless peer-to-peer network.

21. The method of claim 16, where the local wireless peer-to-peer network is formed via Bluetooth connections and the wide area network is formed as a cellular telephone network.

22. The method of claim 16, where the first file is a multimedia file.

23. The method of claim 16, where the local wireless peer-to-peer network is a higher bandwidth network than the wide area network.

24. A method performed by a mobile terminal, the method comprising:
dynamically connecting, by a processor and a communication interface of the mobile terminal, to a local wireless network of predefined mobile terminals that are identified using identifiers, stored by the mobile terminal, based on location information received from at least one of the predefined group of mobile terminals
periodically exchanging, by the communication interface, lists of available files over the local wireless network, where a particular list of available files is exchanged between two mobile terminals without being exchanged across a cellular network;
receiving, by the communication interface, a first file from the cellular network when the first file is not included in the particular list of available files; and
exchanging payment or license information for a second file over the cellular network when the second file is exchanged over the local wireless network.

25. The method of claim 24, further comprising:
exchanging payment or license information for the first file over the cellular network when the first file is received over the cellular network.

26. The method of claim 24, where the local wireless network is a peer-to-peer ad-hoc network that is dynamically formed between mobile terminals in the cellular network.

27. The method of claim 26, where the peer-to-peer ad-hoc network includes at least some mobile terminals separated from each other by multiple hops in the ad-hoc network.

28. The method of claim 26, where the local wireless network is formed via Bluetooth connections.

29. The method of claim 26, where the files are multimedia files.

30. The method of claim 26, where the local wireless network is a higher bandwidth network than the cellular network.

* * * * *